July 27, 1954 — H. F. MASON — 2,684,843

SNAP ACTION DEVICE

Original Filed May 16, 1950

2 Sheets-Sheet 1

INVENTOR:
HOWARD F. MASON
BY HIS ATTORNEYS
HARRIS, KIECH, FOSTER & HARRIS
By [signature]

INVENTOR:
HOWARD F. MASON
BY HIS ATTORNEYS
HARRIS, KIECH, FOSTER & HARRIS
By [signature]

Patented July 27, 1954

2,684,843

UNITED STATES PATENT OFFICE 2,684,843

SNAP ACTION DEVICE

Howard F. Mason, Los Angeles, Calif., assignor to Mason Electric Corporation, Los Angeles, Calif., a corporation of California Original application May 16, 1950, Serial No. 162,256. Divided and this application August 25, 1951, Serial No. 243,722

10 Claims. (Cl. 267—1)

This invention relates to new and useful improvements in snap action devices and is described herein particularly in its application to electrical switches of the momentary or self-centering type. It is contemplated, however, that the device may be adapted for use in other structures where the advantages of the device are deemed practical.

This application is a division of now pending application Serial No. 162,256, filed May 16, 1950, for a snap switch.

Heretofore, momentary switch structure development has not sufficiently advanced to accommodate the mandatory prerequisites required for certain usage. For instance, in the aircraft industry, particular need is for a momentary switch with a positive feel or snap action to affirmatively apprise the operator thereof by sense of touch of the completing or interrupting of an electrical circuit for the predominant noise level in aircraft precludes use of the sense of hearing. Snap characteristics have been incorporated into switch design by means of current carrying leaf springs or reverse bend stress buckling devices intermediate the control toggle or plunger and the contact of the circuit to be completed. Such design has proved unsatisfactory and potentially hazardous in aircraft for no provision is made for forceably separating the contacts in the event of their fusing together as may be cause by remote short circuit in the electrical network.

Further, it is not infrequent that the buckling devices themselves form a part of the electrical circuit to be completed wherein their functional characteristics are subject to alteration due to current passing therethrough. Prior attempts to alleviate this danger resulted in addition of undesirable components supplementing the already excessive weight and size of aircraft control devices.

It is, therefore, an object of this invention to provide a snap action device that requires a relatively small amount of travel of the force applied to flex the device and provides a relatively high reactive force to the force so applied.

It is another object to provide a device of the above character in which the reactive force provided thereby is substantially relieved at an intermediate point of travel of the force applied.

Another object is to provide a snap action device which will occupy a minimum of space and which may be closely confined within a same limited space while either in a normal or a flexed condition.

It is another object to provide a snap action device for an electrical switch adapted to be manually operated whereby the relieving of the reactive force of the device may be perceived by touch.

Another object is to provide a snap action device that imparts a progressively increasing reactive force to the force applied through the initial travel of the force which reactive force at the maximum thereof is then relieved through flexure of the device thereby imparting a reactive force of a flaccid nature throughout the subsequent travel of the force applied.

Another object is to provide a snap action device comprising a unitary deformed leaf material in which the flexure is so limited that the device is capable of withstanding a relatively higher number of operating cycles without fatigue or failure as compared to now conventional snap acting devices.

Another object is to provide a snap action device comprising a plurality of unitary leaf members which may be stacked or nested in superimposition and in such a number as to satisfy desired requirements of reactive force.

A further object is to provide a snap action device of the foregoing character with a support member which co-operates with the flexing element in such a manner as to accentuate the snap action.

An additional object is to provide the support member with projections for operative engagement with the flexing element during a cycle of operation of the snap action device.

The invention also has for its objects to provide such means that are positive in operation, economical of manufacture, relatively simple, and of general superiority and serviceability.

The invention also comprises novel details of construction and novel combinations and arrangements of parts, which will more fully appear in the course of the following description. However, the drawings merely show and the following description merely describes a preferred embodiment of the present invention in cooperation with an electrical switch, which is given by way of illustration or example only.

In the drawings, like reference characters designate similar parts in the several views.

Figure 1:
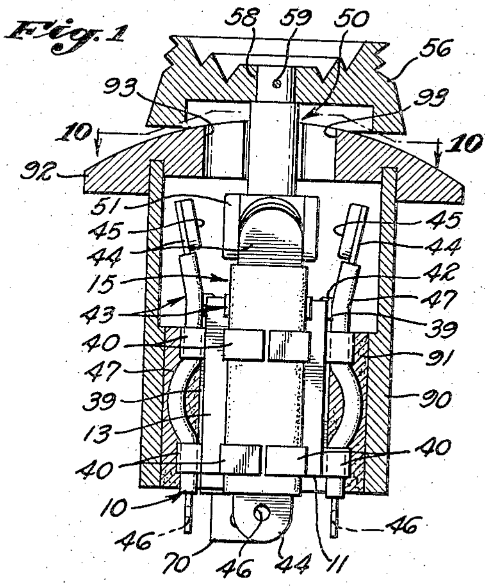
Fig. 1 is a side elevational view of an electric switch that incorporates the present invention, the switch being shown with the case partially removed and showing the internal working parts thereof.
Figure 9A:
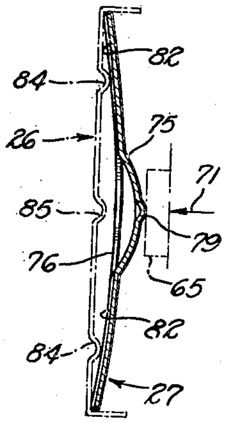
Figure 9B:
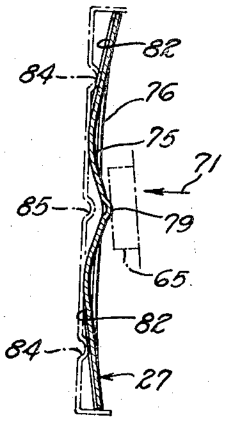
Figure 10:
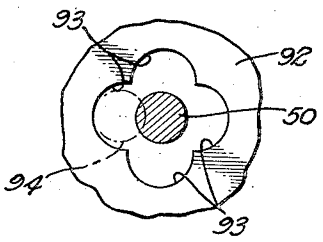

Figs. 9*a* and 9*b* are enlarged elevational sections of the spring detent shown in the normal and in the stressed positions respectively; and Fig. 10 is a fragmentary sectional plan view of the cap taken along the line 10—10 of Fig. 1.

Figure 3:
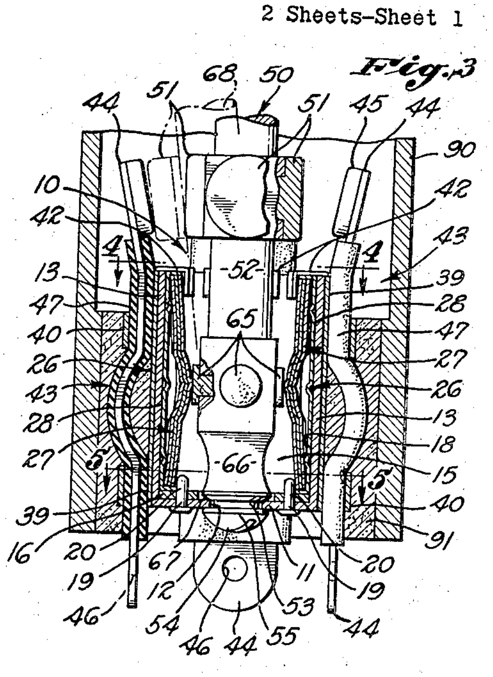
Fig. 3 is an enlarged fragmentary sectional view, partially cut away, taken along the line 3—3 of Fig. 2.
Figure 4:
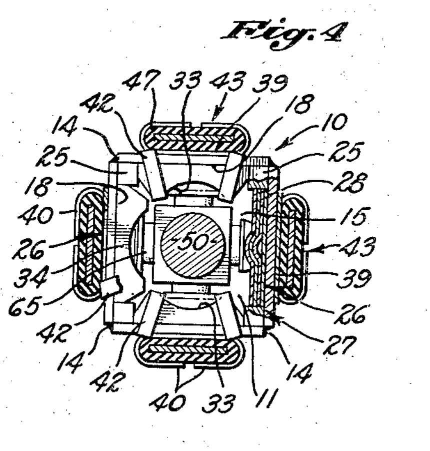
Fig. 4 is a sectional plan view taken along the line 4—4 of Fig. 3.
Figure 5:
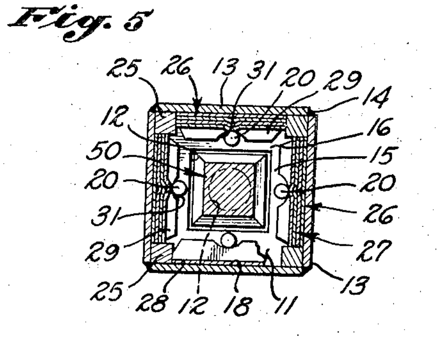
Fig. 5 is a sectional plan view taken along the line 5—5 of Fig. 3.

In the drawings, wherein for the purpose of illustration is shown the preferred embodiment of this invention, and first particularly referring to Figs. 1–5, inclusive, representing an electrical switch incorporating the snap action device of the present invention, the reference numeral 10 indicates the frame of the switch which is preferably fabricated of sheet metal and having a base 11 with a center hole 12 therein as seen in Fig. 5 and having upturned side portions 13, the side portions meeting at their edges as indicated by the numeral 14, thus forming a cavity 15 for the frame. The frame 10 is shown as substantially a parallelepiped, but it is within contemplation that other forms may be constructed, for example, cylindrical or octagonal.

A key plate 16 as best seen in Figs. 3 and 5 having an outside periphery corresponding to the inner wall surfaces 18 of the frame 10 is attached to the base 11 on the cavity side thereof by means of a plurality of studs 19, the studs being secured to the base and extending through the key plate to provide a protruding stem 20 adjacent each side portion 13. The key plate 16 is provided with a central void extending therethrough and having an internal periphery substantially parallel to the side portions 13.

A guide bar 25 is provided at each juncture 14 of adjacent side portions, extending from the key plate 16 to the opening of the cavity 15, and is secured to each adjacent side portion by spot welding or any adequate attaching means. Such securing effects complete structure rigidity of the frame 10 and retains the key plate 16 in position.

Disposed between each adjacent pair of guide bars 25 is a support plate 26 (detailed in Fig. 7) and one or a plurality of spring detents 27 (detailed in Fig. 6) associated with each plate, which comprise the spring means for the switch. The spring detents 27 may be used individually or nested together as indicated in the drawings. For purposes of expediency, the function of the plate 26 and detents 27 will be described hereinafter.

Figure 7:
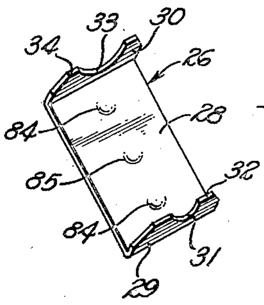
Fig. 7 is a perspective view of the support member that may be used in conjunction with the spring detent of Fig. 6.

Referring to Fig. 7, the support plate 26 has a base portion 28 and upturned opposite ends 29 and 30 substantially parallel to each other to provide retaining abutments for the detents 27. The end 29 is provided with a notch 31 on the outer edge 32 thereof, whereas the end 30 has a circumferential depression 33 on the outer edge 34 thereof.

One or more spring detents 27 may be nested or stacked on the base portion 28 and within the ends 29 and 30 of the support plate 26 and the combination slidably inserted between the guide bars 25 (see Fig. 5) to engagement with the key plate 16 whereby the protruding stem 20 of a stud 19 engages the notch 31 to retain the base portion of the plate in fixed abutment with the inner side wall 18 of the side portion 13. The stem 20 also serves to prevent the detent 27 from falling from position. Thus, it is readily seen that the support plate 26 and its associated detent 27 are retained in position on three sides.

To complete the securing of the plate 26 and the detent 27, a bracket 39, as best seen in Figs. 1 and 4, is attached, for example, by spot welding to the outer surface of each side portion 13, each bracket being provided with extending fingers 42 that bend over the side portions and into the cavity 15 and firmly engage the outer edge 34 of the support plate 26 and extend further to retain a detent or detents 27 in position.

The brackets 39 also serve by means of integral straps 40 to mount electrical contact assemblies 43 to the frame 10. Each assembly 43, as best seen in Fig. 3, comprises an arm or pole 44 made of a flat strip of electrical conductive material and sufficiently flexible and resilient to yield along the flat under cantilever stress as hereinafter will be described. At one end of the arm 44 is a contact button 45, the other end 46 being provided with a hole to receive a connecting wire. A band of electrical insulating material 47 is wrapped about the arm 44 intermediate the ends thereof so that when the assembly 43 is placed in position it will be electrically insulated from the frame 10. The straps 40 that laterally extend from the bracket 39 are bent over to secure the assembly 43 in such a position that the contact button 45 is disposed above and directly toward the cavity 15 of the frame 10. For purposes of illustration only, four contacts are utilized and are symmetrically disposed about the frame 10 and directed toward the cavity 15. It is contemplated, however, that the structure may be so arranged to accommodate any plurality of contact buttons symmetrically disposed about the said frame. The associated arm 44 of each contact 45 is connected at the hole 46 to the appropriate circuit to be connected or energized.

The abovementioned plurality of circuits are individually energized from a common source of potential and are initiated by a manually displaceable armature 50 as seen in Fig. 1 which is partially disposed in the confines of the cavity 15 and having contact buttons 51 appropriately located thereon and juxtaposed opposite to the corresponding contact buttons 45 of the assemblies 43.

Figure 8:
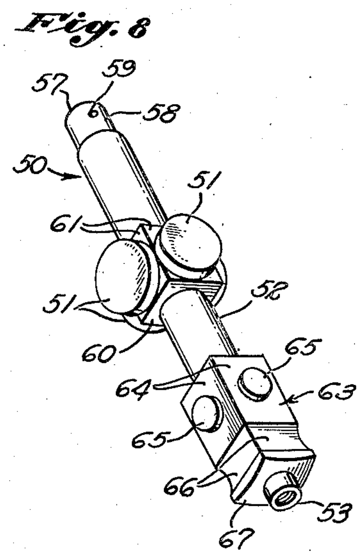
Fig. 8 is a perspective view of the armature of the switch of Fig. 1.

The armature 50, as detailed in Fig. 8, is essentially a shaft 52 and has a stem 53 that extends through the center hole 12 of the base 11 as best seen in Fig. 3. The armature 50 is limited in vertical movement by means of a screw or stud 54 tapped or pressed into the stem 53 from the exterior of the frame 10. A lockwasher 55 may be used to prevent the screw 54 from loosening due to external vibration as well as to provide a greater contact area against the base 11. The stem 53 is of such diameter and sufficient length to extend substantially through the base 11 so as to permit the armature 50 to be angularly displaced within the cavity without stressing the base 11. The actuated end 57 of the armature 50 is provided with an undercut 58 and a dowel or pin hole 59 to accommodate attachment of a knob 56, as seen in Fig. 1. Intermediate the ends of the armature 50 is an enlarged portion 60 that may be of any suitable shape to provide an adequate mounting area for the contact buttons 51. The drawing shows this enlarged portion 60 to be substantially cuboid in shape providing mounting spaces or surfaces 61 to which the contacts 51 are rigidly fixed and electrically conductive thereto.

Adjacent the stem 53 is another enlarged portion 63 having faces 64 parallel to faces 61 of the enlarged portion 60. Each surface 64 has a salient stud 65 protruding therefrom to engage with its corresponding detent 27 when the armature 50 is angularly moved toward the said detent. The stud 65 is rigidly pressed into each surface 64 and is made of an insulating material and abradable as compared to the detent 27 so that any abrasion or wear will appear at the stud 65 so as to preserve the spring characteristics of the detent. The surfaces 64 are grooved transversely and tangential to the shaft 52 as indicated by the numeral 66 to preclude interference with the studs 19 when the armature is displaced.

The bottom face 67 of portion 63 is substantially spheroid in form, being in abutment with the base 11 and accommodates the rocking motion of the armature 50 at the base 11 of the frame 10 so as to maintain continuous electrical contact therewith. Referring to Fig. 3, the contact of the armature 50 with the base 11 can be visualized. Effectively the armature may be displaced from the vertical in any direction, as by universal movement, and maintain itself in continuous contact with the base 11.

Figure 2:
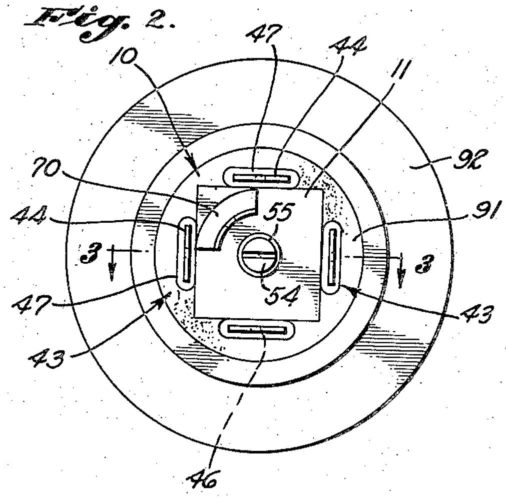
Fig. 2 is a bottom view of the structure shown in Fig. 1.

Since a plurality of the detents 27 adapted to the frame 10 are juxtaposed opposite the corresponding stud 65 of the armature 50, the detents themselves provide a means to maintain the freely displaceable armature 50 centermost of the cavity 15 and out of engagement with the contact buttons 45. In Figs. 1 and 2, the switch contacts are all normally open. However, it is contemplated that one or more may be normally closed. Manual armature actuation to the phantom position indicated by numeral 68 as seen in Fig. 3, will cause engagement of corresponding contacts 45 and 51 to energize the associated circuits. Release of the armature will result in the associated detent 27 forceably returning the armature 50 to its center normal position.

The electrical aspects of the switch are as follows: The armature 50 serves as a common terminus for all of the contacts 45. A source of electrical energy may be applied to the armature 50 through the medium of a common terminal 70 that may be attached to any portion of the frame 10, in the drawings being indicated as attached to the outer face of the base 11 as best seen in Fig. 2. Electrical energy is conducted from the base 11 (see Fig. 3) through the surface contact of spheroid face 67 of the armature 50 and thence through the armature to the contacts 51 thereon. Angular displacement of the armature 50 toward any of the contacts 45, being against restraint of the associated detent 27, communicates the appropriate contacts 45 and 51 thereby conducting the potential through the associated arm 44 and to the circuit to be energized.

Particularly significant during engagement of contacts 45 and 51 is the progressive wiping action thereof as the armature 50 moves to its maximum displacement. As hereinabove indicated, the arm 44 is resilient and when contact is made, it will yieldingly move away from the upper portion of the frame 10 under influence of the armature. The pivotal motion of the armature, its radius arm, and the outward angle of the arm 44 all coactively interrelate so that from the instant of contact to the maximum displacement of the armature, the contacts 45 and 51 will slide or wipe with respect to each other, the said wipe being effective as to both of said contacts. Thus, if the engaging surface has oxidized, pitted or become contaminated by foreign elements, the slide action will substantially assure completion of the circuit to be energized. Further, the relative portion of the contacts will effectively wipe the surface and remove, by abrasion, the deposit of foreign substances that may have accumulated thereon.

The hazard of fused contacts is minimized by the structure disclosed in that the contacts may be forceably separated by manual pressure of the operator in the event that the detent force is insufficient to separate the contacts. Angular displacement of the knob 56 away from the fused contacts tends to draw the arm 44 along with the armature 50. The internal shearing stress built up in the arm 44 coupled with longitudinal stress therein as the contacts tend to wipe is sufficient to separate the contacts 45 and 51 under usual fused conditions. In addition, when the arm 44 has returned to a position wherein it presses against the bracket 39 which is firmly mounted to the frame 10, its motion is further restrained at the upper portion of the frame to practically assure interrupting the circuit.

Hence, there is provided a means to individually energize the four circuits that may be connected to the arms 44. Although four paths for circuit energization are shown in the drawing, such is not to be deemed a limitation of the disclosure. It is contemplated that the frame structure and associated components may be designed in variation to accommodate a plurality of circuits, more or less than represented herein.

The switch assembly, as above described, is disposed within the confines of a hollow case 90 as seen in Fig. 1, the case being preferably formed of an insulating material such as Bakelite, and the assembly being retained in said case by a filler substance 91 such as polyethyl and properly heat treated to cause adherence of the switch assembly to the case. A cap 92 is rigidly affixed to the top of the case and is provided with a central opening therethrough defined by coalescent circumferential coves 93, as best shown in Fig. 10, that are adapted to receive the armature 50 when displaced. The coves 93 are effective to direct as well as limit the motion of the displaced armature, as indicated in phantom by the numeral 94.

Figure 6:
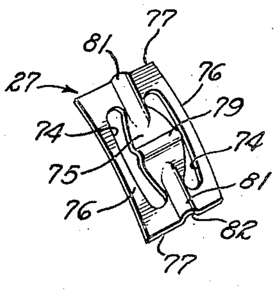
Fig. 6 is a perspective view of the spring element or detent embodied in the present invention.

The detent 27 provides a novel means of action of the switch armature and the resultant physically perceptible snap. Fig. 6 shows a perspective of the detent 27 in detail in normal position. Figs. 9*a* and 9*b* show an exaggerated cross section of the detent as normal and as flexed respectively, when operatively associated with the support plate 26. As hereinbefore indicated, a stud 65 is the engaging member with the detent, the force being represented by the arrow 71 as seen in Figs. 9a and 9b.

The detent 27 is preferably made of a material such as strip beryllium copper which, after fabrication and heat treating, is highly resilient and fatigue resistant. It is substantially rectangular in plan view with a length approximately twice that of the width, but dimensional variations are expressly within the scope of the disclosure. In both side elevations, the detent 27 is convexo-concave or slightly arched rendering the strip or leaf convexo-concave in both dimensions. Two symmetrical longitudinal and curvilinear slots or voids 74 are die stamped or perforated through the detent to provide an intermediate or center band 75 and two side bands 76 which terminate at buttress ends 77. The center band 75 is provided with a more pronounced arch than the side bands and protrudes above the side bands as shown in Fig. 9a. Also, the center band 75 is further deformed intermediate its ends by an upwardly coved transverse arch 79. Two convexo-concave reinforcing ribs 81 provide further deformation of the center band 75 and buttress ends 77 being longitudinal of the center band 75 and extending from a point adjacent the transverse arch 79 to and through the buttress ends 77, thereby forming channels 82 on the under side thereof.

The detent 27 is flexed by means of force applied to the transverse arch 79. Let it be assumed that the detent is placed upon a flat supporting surface and force progressively applied. The said force tends to flatten the center band 75 causing the ends 77 to first depress into firm contact with the support surface. The force also tends to spread the buttress ends 77 away from each other thereby effectively causing the side bands 76 to come into flat engagement with the support surface. Further, the force tends to transversely flatten the buttress ends 77. When this longitudinal and transverse flattening reaches an ultimate point, the center band 75 is under considerable stress, the forces being resolved against the sides of the transverse arch 79 and resulting in a flexing thereof to permit the center band to snap through in a direction normal to the surface, the reactive force component operating through the reinforcing ribs 81 to cause the buttress ends to rise from the surface. Simultaneously, the side bands 76 will rise from the surface. The detent is then flexed as seen in Fig. 9b but under internal stress that tends to cause a return to normal position as seen in Fig. 9a.

If the detent 27 is used in conjunction with the support plate 26, a more positive snap action will occur. This is primarily due to two salient projections or dimples 84 which are provided in the base portion 28 of the support plate 26. The projections 84 are substantially laterally central of the base portion 28 and adjacent the depending ends 29 and 30 and so positioned to engage the channels 82 of the detent 27. The initial force on the center band 75 tends to flatten it, but instead of the ends 77 thereof being firmly pressed onto the support surface as hereinbefore indicated, the channels 82 are depressed into firm point contact with the dimples 84. The side bands 75 and buttress ends 77 progressively flatten, but the opposing force is now primarily at projections 84. Under these conditions, the snap through of the detent is more pronounced.

The support plate 26 may be provided with a third upwardly convex projection or dimple 85 located symmetrically centermost of the base portion 28, to engage with the under side of the transverse arch 79. In this manner, any excessive force that may be applied to the detent will not crush the transverse arch.

Peculiarly characteristic of the detent action is the restraining force opposing the force applied. For example, but not in limitation, the detent may be so designed that two and one-half pounds force is necessary to cause a snap through, however, only one-half pound is necessary to maintain the detent flexed. Effectively, therefore, the restraining force is relieved to such an extent to retain only sufficient force to assure a return of the armature to neutral. The internal stresses in the detent that tend to return it to normal provide only relatively small force against its engaging stud 65 which is physically perceptible at the armature as a flaccid or spongy condition. Little effort, therefore, is necessary to maintain the contacts closed. Upon relieving the holding force by the operator, the internal stresses in the detent are relieved and transmitted to the armature as a physically perceptible snap. Accordingly, the operator has a definite touch indication when the circuit is closed or opened.

The force necessary to actuate the switch is capable of variation by using a plurality of detents nested or placed on top of each other. Fig. 3 is representative of such application wherein three detents are shown in cross section for each individual switch element.

The function of the detent in minimizing arcing at the contacts may now be readily understood in that the contacts make and/or break with a considerably greater velocity than they would otherwise in the absence of the detents. The increase in velocity is effected due to the relieving of the restraining force as the detent snaps through. Conversely, when permitting the circuit to open, the internal stresses in the detent that convert to an active force when snapping back increase the velocity of contact break. The interaction of the detent with the purely physical muscular reaction of the operator affords this velocity increase without the aid of mechanical acceleration devices.

While the invention that has been illustrated and described is now regarded as the preferred embodiment, the construction is, of course, subject to modifications without departing from the spirit and scope of the invention. It is, therefore, not desired to restrict the invention to the particular form of construction illustrated and described, but to cover all modifications that may fall within the scope of the appended claims.

I claim as my invention:

1. In a snap action device: a leaf spring shaped in convexo-concave form in a longitudinal direction having stresses therein tending to maintain said spring extending in a normally stable longitudinal direction including perforations therethrough to provide longitudinally thereof two side portions and an intermediate portion terminating in buttress ends; a convexo-concave rib formed in each buttress end and extending partially through said intermediate portion; and means operative to exert an external force on said intermediate portion to flatten and cause said spring to flex with a snap action.

2. In a snap action device: a leaf spring shaped in convexo-concave form in a longitudinal direction having stresses therein tending to maintain said spring extending in a normally stable longitudinal direction including slots therethrough to provide longitudinally thereof two side portions and an intermediate portion terminating in buttress ends, said intermediate portion having a more pronounced deformation than said side portions; a convexo-concave rib formed in each buttress end and extending partially through said intermediate portion; and means operative to exert an external force on said intermediate portion to flatten and cause said spring to flex with a snap action.

3. In a snap action device: a leaf spring shaped in convexo-concave form in both dimensions having stresses therein tending to maintain said spring extending in a normally stable longitudinal direction, and including slots therethrough to provide longitudinally thereof two side portions and a center portion: a transverse arch substantially across said center portion for further deformation thereof; and means operative to exert an external force on said arch to cause said spring to flex with a snap action.

4. In a snap action device: a leaf spring shaped in convexo-concave form throughout its length and across its width having stresses therein tending to maintain said spring stable in said form, and including curvilinear slots therethrough to provide substantially longitudinally thereof two side portions and a center portion terminating in buttress ends, said center portion having a more pronounced deformation than said side portions; a convexo-concave rib in each buttress end longitudinally of said spring and extending partially through said center portion; a transverse arch in said center portion for further deformation thereof; and means operative to exert an external force on said arch to cause said spring to flex with a snap action.

5. In a snap action device: a leaf spring shaped in convexo-concave form in a longitudinal direction having stresses therein tending to maintain said spring stable in said form, and including slots therethrough to provide longitudinally thereof two side portions and an intermediate portion terminating in buttress ends; a convexo-concave rib in each buttress end longitudinal of said spring and extending partially through said intermediate portion; a support for said spring providing a pair of projections for operative engagement with the concave side of said ribs; and means operative to exert an external force on said intermediate portion against restraint of said projections to cause said spring to flex with a snap action.

6. In a snap action device: a leaf spring shaped in convexo-concave form in a longitudinal direction having curvilinear slots therethrough to provide longitudinally thereof two side portions and a center portion terminating in buttress ends, said spring having stresses therein tending to maintain it normally stable in said form; a transverse arch in said center portion for further deformation thereof; a convexo-concave rib in each buttress end longitudinal of said spring and extending partially through said center portion; a support for said spring providing a pair of first projections for operative engagement with the concave side of said ribs and a second projection for operative engagement with the concave side of said arch; and means operative to exert an external force on said arch against restraint of said first projections to cause said spring to flex with a snap action and render said second projection in firm abutment with said transverse arch.

7. A snap action device comprising: an integral strip of spring material in convexo-concave form in a longitudinal direction and slotted longitudinally to form a pair of side portions and an intermediate portion terminating in buttress ends; deformations in said spring providing internal stresses therein including a more pronounced deformation of said intermediate portion above the curvilinear plane of said side portions; a transverse arch substantially across said intermediate portion; a convexo-concave rib in each buttress and extending longitudinally of said spring and partially through said intermediate portion; a support for said spring having a pair of first projections for co-operative engagement with the concave side of said ribs and a second projection for limiting engagement with said transverse arch; and means operative to exert an external force on said transverse arch against restraint of said first projections to cause said spring to flex with a snap action, the motion thereof being limited by engagement of said second projection with said transverse arch.

8. In a snap action device: a leaf spring shaped in convexo-concave form in at least one dimension and having stresses therein tending to maintain said spring extending in a normally stable direction along one of said dimensions including perforations therethrough to provide along one of said dimensions two side portions and an intermediate portion terminating in buttress ends; a convexo-concave rib formed in each buttress end and extending partially through said intermediate portion; and means operative to exert an external force on said intermediate portion to flatten and cause said spring to flex with a snap action.

9. In a snap action device: a leaf spring shaped in convexo-concave form in a longitudinal direction having stresses therein tending to maintain said spring stable in said form, and including slots therethrough to provide longitudinally thereof two side portions and an intermediate portion terminating in buttress ends; a convexo-concave rib in at least one of said buttress ends longitudinal of said spring and extending partially through said intermediate portion; a support for said spring providing a projection for operative engagement with the concave side of said ribs; and means operative to exert an external force on said intermediate portion against restraint of each of said projections to cause said spring to flex with a snap action.

10. In a snap action device comprising an integral strip of spring material in convexo-concave form in a longitudinal direction and slotted longitudinally to form a pair of side portions and an intermediate portion terminating in buttress ends: deformations in said spring providing internal stresses therein including a more pronounced deformation of said intermediate portion above the curvilinear plane of said side portions; a transverse arch substantially across said intermediate portion; a convexo-concave rib in each buttress end extending longitudinally of said spring and partially through said intermediate portion; a support for said spring having a pair of first projections for co-operative engagement with the concave side of said ribs and a second projection for limiting engagement with said transverse arch; a pair of upstanding abutments for said support juxtaposed opposite said buttress ends to retain said spring longitudinally of said support; and means operative to exert an external force on said transverse arch against restraint of said first projections to cause said spring to flex with a snap action, the motion thereof being limited by engagement of said second projection with said transverse arch.

References Cited in the file of this patent

UNITED STATES PATENTS

| Number | Name | Date |
|---|---|---|
| Re. 23,412 | Hollis | Sept. 25, 1951 |
| 1,668,974 | Mottlau | May 8, 1928 |
| 1,895,590 | Spencer | Jan. 31, 1933 |
| 2,249,837 | Lee | July 22, 1941 |
| 2,299,562 | Burch | Oct. 20, 1942 |
| 2,340,615 | Rath | Feb. 1, 1944 |
| 2,479,313 | Clark | Aug. 16, 1949 |

FOREIGN PATENTS

| Number | Country | Date |
|---|---|---|
| 457,925 | Germany | Mar. 27, 1928 |